US009951723B2

(12) United States Patent
Isogai

(10) Patent No.: US 9,951,723 B2
(45) Date of Patent: Apr. 24, 2018

(54) TURBOCHARGING SYSTEM FOR USE WITH INTERNAL COMBUSTION ENGINE

(71) Applicant: OTICS Corporation, Nishio (JP)

(72) Inventor: Tomoyuki Isogai, Aichi (JP)

(73) Assignee: OTICS Corporation, Nishio (JP)

( * ) Notice: Subject to any disclaimer, the term of this patent is extended or adjusted under 35 U.S.C. 154(b) by 116 days.

(21) Appl. No.: 14/957,829

(22) Filed: Dec. 3, 2015

(65) Prior Publication Data

US 2016/0169165 A1    Jun. 16, 2016

(30) Foreign Application Priority Data

Dec. 12, 2014    (JP) .................................. 2014-252157

(51) Int. Cl.
*F02M 35/022*    (2006.01)
*F02B 29/04*    (2006.01)
(Continued)

(52) U.S. Cl.
CPC ............. *F02M 26/22* (2016.02); *F02B 29/04* (2013.01); *F02B 29/0468* (2013.01);
(Continued)

(58) Field of Classification Search
CPC ........ F02M 26/04; F02M 26/06; F02M 26/22; F02M 35/022; F02M 35/0223;
(Continued)

(56) References Cited

U.S. PATENT DOCUMENTS 3,884,658 A * 5/1975 Roach .................... B01D 45/12
123/559.1
4,482,365 A * 11/1984 Roach .................... F02M 35/08
55/283
(Continued)

FOREIGN PATENT DOCUMENTS

DE    33 38 273 A1    5/1985
EP    2199585 A1 *  6/2010    ............. F02M 26/06
(Continued)

OTHER PUBLICATIONS

Extended Search Report dated May 17, 2016 in European Patent Application No. 15195962.4.

*Primary Examiner* — Audrey K Bradley
(74) *Attorney, Agent, or Firm* — Oblon, McClelland, Maier & Neustadt, L.L.P.

(57) ABSTRACT

A turbocharging system for use with an internal combustion engine, which includes an exhaust gas feeding passage configured to feed exhaust gas of an internal combustion engine to a turbine unit; an exhaust gas passage configured to release the exhaust gas discharged from the turbine unit outside of the turbocharging system; an intake air passage configured to feed intake air into the compressor unit; a compressed air passage configured to feed compressed air discharged from the compressor unit to the internal combustion engine; an intercooler configured to cool the compressed air flowing through the compressed air passage; and an LPL-EGR passage configured to recirculate at least a part of the exhaust gas flowing through the exhaust gas passage, (Continued)

into the intake air passage, wherein the compressed air passage is provided with a cyclone-type collecting device arranged upstream of the intercooler to collect foreign substances contained in the compressed air.

4 Claims, 3 Drawing Sheets

(51) Int. Cl.
*F02B 33/44* (2006.01)
*F02M 26/22* (2016.01)
*F02M 26/06* (2016.01)
*F02M 26/04* (2016.01)
*F28F 19/01* (2006.01)
*F02M 35/04* (2006.01)

(52) U.S. Cl.
CPC ............ *F02B 33/44* (2013.01); *F02M 26/04* (2016.02); *F02M 26/06* (2016.02); *F02M 35/0223* (2013.01); *F28F 19/01* (2013.01); *F02M 35/042* (2013.01); *Y02T 10/146* (2013.01)

(58) Field of Classification Search
CPC ... F02M 35/042; F02B 29/04; F02B 29/0468; F02B 33/44; F28F 19/00; Y02T 10/146
See application file for complete search history.

(56) References Cited

U.S. PATENT DOCUMENTS

| | | | |
|---|---|---|---|
| 6,748,741 B2* | 6/2004 | Martin | F01N 3/005 123/559.1 |
| 7,451,750 B1* | 11/2008 | Fox | F02B 29/0468 123/568.12 |
| 2002/0189256 A1 | 12/2002 | Kalish | |
| 2008/0028757 A1* | 2/2008 | Eitel | F01N 3/021 60/311 |
| 2009/0000283 A1 | 1/2009 | Endicott et al. | |
| 2011/0011084 A1 | 1/2011 | Yanagida et al. | |
| 2013/0305693 A1* | 11/2013 | Heim | F02M 25/074 60/278 |

FOREIGN PATENT DOCUMENTS

| | | |
|---|---|---|
| FR | 2 955 621 A1 | 7/2011 |
| JP | 2002-180841 | 6/2002 |
| WO | WO 03/001039 A1 | 1/2003 |

* cited by examiner

TURBOCHARGING SYSTEM FOR USE WITH INTERNAL COMBUSTION ENGINE

CROSS-REFERENCE TO RELATED APPLICATION

The present application claims priority under 35 U.S.C. § 119 to Japanese Application No. 2014-252157, filed on Dec. 12, 2014, entitled "TURBOCHARGING SYSTEM FOR USE WITH INTERNAL COMBUSTION ENGINE". The contents of this application are incorporated herein by reference in their entirety.

BACKGROUND OF THE INVENTION

Field of the Invention

The present invention relates to a turbocharging system for use with an internal combustion engine.

Description of Related Art

A turbocharger provided in a turbocharging system for use with an internal combustion engine includes a turbine impeller and a compressor impeller that are rotated together through a rotor shaft. An exhaust gas of the internal combustion engine fed to the turbine impeller rotates the turbine impeller, which rotates the compressor impeller to compress intake air and discharge the compressed air to the internal combustion engine (see Patent Document 1).

PATENT DOCUMENTS

Patent Document 1: JP-A 2002-180841

To reduce nitrogen oxides (NOx) in the exhaust gas and improve the combustion efficiency, some internal combustion engines are equipped with a low-pressure loop exhaust gas recirculation (LPL-EGR) device, which recirculates a part of the exhaust gas downstream of a turbocharger to a position upstream of the compressor of the turbocharger. Such engines are also provided with an intercooler, downstream of the compressor, for cooling the compressed air discharged from the compressor. Intercoolers typically include a stack of thin films made of materials such as aluminum. The exhaust gas recirculated to a position upstream of the compressor (EGR gas) contains foreign substances, such as condensate. The condensate, when reaching the intercooler, may deposit on the thin films of the intercooler and cause corrosion of the intercooler.

To inhibit the corrosion of the intercooler, a filter-type collecting device that includes a filter to collect the foreign substances, such as the condensate, may be placed on the passage of the compressed air. Providing such a filter-type collecting device, however, tends to increase pressure loss. If the pressure loss is increased excessively, the intake efficiency of the internal combustion engine may be reduced. Hence, there is still room for improvement in turbocharging systems that are equipped with a filter-type collecting device, in order to inhibit reduction of intake efficiency in internal combustion engines while various foreign substances, such as condensate and particulate matter, are removed sufficiently.

The present invention has been achieved in view of the above and provides a turbocharging system for use with an internal combustion engine that is capable of preventing corrosion of an intercooler provided to cool compressed air and achieving improvement in intake efficiency of the internal combustion engine over a configuration with a filter-type collecting device.

SUMMARY OF THE INVENTION

One aspect of the present invention provides a turbocharging system for use with an internal combustion engine, the turbocharging system including:

a turbocharger including a turbine unit and a compressor unit, the turbine unit including a turbine impeller, the compressor unit including a compressor impeller connected to the turbine impeller;

an exhaust gas feeding passage configured to feed exhaust gas of an internal combustion engine to the turbine unit;

an exhaust gas passage configured to release the exhaust gas discharged from the turbine unit outside of the turbocharging system;

an intake air passage configured to feed intake air into the compressor unit;

a compressed air passage configured to feed compressed air discharged from the compressor unit to the internal combustion engine;

an intercooler configured to cool the compressed air flowing through the compressed air passage; and an LPL-EGR passage configured to recirculate at least a part of the exhaust gas flowing through the exhaust gas passage, into the intake air passage, wherein the compressed air passage is provided with a cyclone-type collecting device arranged upstream of the intercooler, the cyclone-type collecting device being configured to collect foreign substances contained in the compressed air.

In the turbocharging system for use with an internal combustion engine, the exhaust gas of the internal combustion engine rotates the turbine impeller, which rotates the compressor impeller to compress air fed through the intake air passage. The compressed air flows through the compressed air passage and passes through the cyclone-type collecting device and reaches the intercooler before fed to the internal combustion engine. In the cyclone-type collecting device, due to the boost pressure of compressed air, a rotational flow is generated in the compressed air. The rotational flow in the compressed air produces centrifugal force, causing condensate and other substances contained in EGR gas to be separated from the compressed air. Such mechanism can inhibit condensate from depositing on the intercooler positioned downstream of the collecting device, so that corrosion of the intercooler is inhibited. Placing the collecting device on the compressed air passage, through which the compressed air flows, enables effective use of the boost pressure of the compressed air as the energy to turn the compressed air flowing in the collecting device into the rotational flow.

In the turbocharging system for use with an internal combustion engine, use of the cyclone-type collecting device enables efficient collection of foreign substances, such as condensate. In this manner, since the cyclone-type collecting device enable to inhibit pressure loss, intake efficiency of the internal combustion engine is improved over a configuration with a filter.

As described above, the present invention provides a turbocharging system for use with an internal combustion engine that is capable of preventing corrosion of an intercooler provided to cool compressed air and achieving improvement in intake efficiency of an internal combustion engine over a configuration with a filter-type collecting device.

Figure 1:
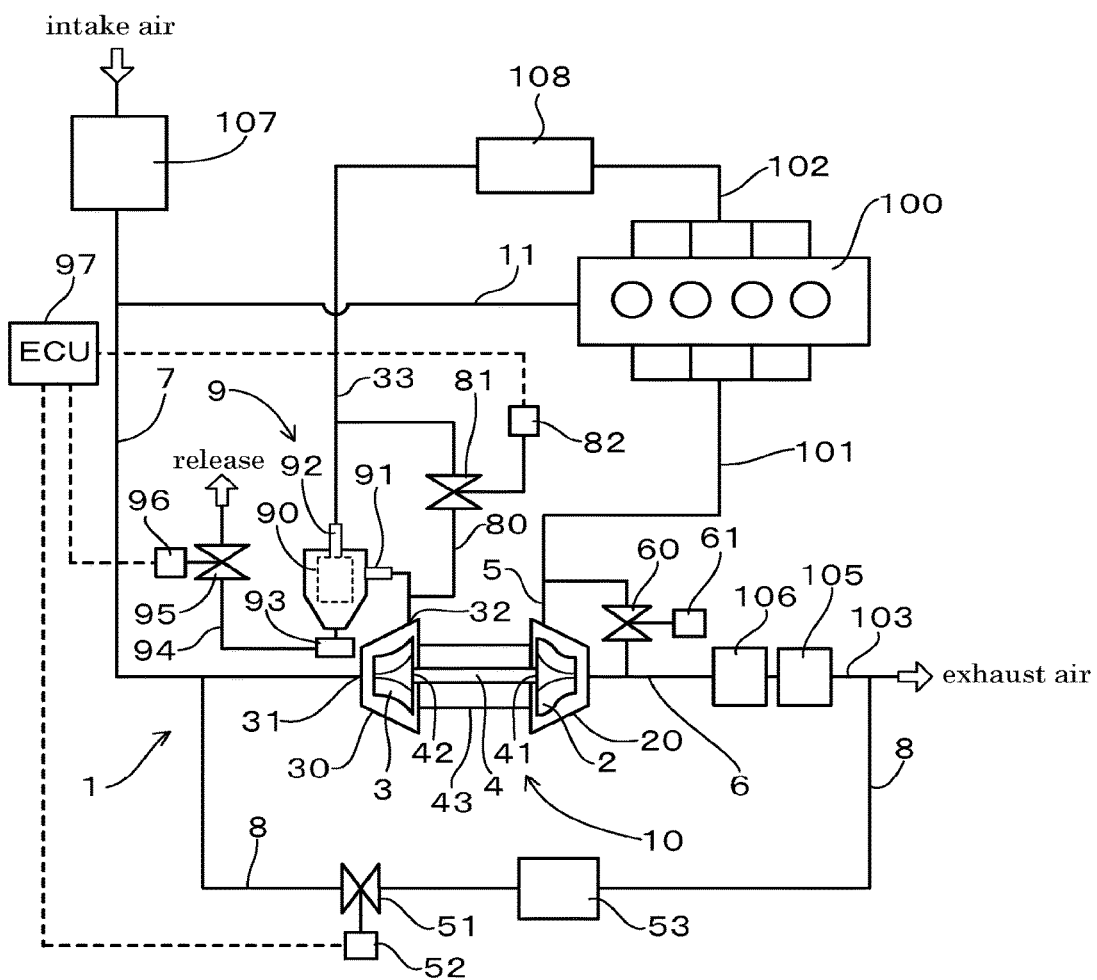
FIG. 1 is a schematic diagram of a turbocharging system for use with an internal combustion engine according to a first embodiment.

The compressed air passage may be provided with a bypass passage configured to bypass the cyclone-type collecting device, a bypass passage opening/closing section configured to open and close the bypass passage, and a bypass passage opening/closing controller configured to control the open/closed state of the bypass passage opening/closing section. In this case, the bypass passage opening/closing controller can be configured to open the bypass passage opening/closing section to provide communication through the bypass passage at a desired timing and thereby allow the compressed air flowing through the compressed air passage to bypass the collecting device. As a result, the present invention is capable of reducing flow resistance of the compressed air passing through the compressed air passage and thereby preventing reduction in intake efficiency of the internal combustion engine.

The turbocharging system may include an LPL-EGR passage opening/closing section configured to open and close the LPL-EGR passage, wherein the bypass passage opening/closing controller may be configured to control the bypass passage opening/closing section in such a manner that the bypass passage opening/closing section is closed when the LPL-EGR passage opening/closing section is open and the bypass passage opening/closing section is open when the LPL-EGR passage opening/closing section is closed. In this case, the compressed air can be allowed to flow through the collecting device only when the EGR gas is fed to the compressor unit, and allowed to bypass the collecting device when the EGR gas is not fed to the compressor unit. When the EGR gas is not fed to the compressor unit, foreign substances, such as condensate, are not mixed into the compressed air. Thus, there is no need to allow the compressed air to flow through the collecting device. Such a configuration enables the compressed air to flow through the collecting device when foreign substances, such as condensate, should be separated from the compressed air and enables the compressed air to bypass the collecting device when there is no need to separate foreign substances, and thereby reduces flow resistance of the compressed air through the compressed air passage. In this manner, the present invention is capable of preventing corrosion of the intercooler and preventing reduction in intake efficiency of the internal combustion engine.

The turbocharging system for use with an internal combustion engine may also include a reservoir configured to store substances collected by the cyclone-type collecting device, a collected substance releasing passage configured to release the collected substances stored in the reservoir, a releasing passage opening/closing section configured to open and close the collected substance releasing passage, and an opening/closing controller configured to control open/closed state of the releasing passage opening/closing section. In this case, the opening/closing controller can be configured to control the release of the collected substances stored in the reservoir; thus, excessive accumulation of collected substances in the reservoir is prevented.

FIRST EMBODIMENT

An embodiment of a turbocharging system for use with an internal combustion engine will now be described with reference to FIGS. 1 to 4.

As illustrated in FIG. 1, a turbocharging system 1 for use with an internal combustion engine according to the present embodiment includes a turbocharger 10 including a turbine unit 20 and a compressor unit 30. The turbine unit 20 includes a turbine impeller 2, and the compressor unit 30 includes a compressor impeller 3 connected to the turbine impeller 2. The turbocharging system 1 for use with an internal combustion engine further includes an exhaust gas feeding passage 5 which feeds exhaust gas of an internal combustion engine 100 to the turbine unit 20, and an exhaust gas passage 6 which releases the exhaust gas discharged from the turbine unit 20 to the outside. The turbocharging system 1 also includes an intake air passage 7 which feeds intake air to be drawn into a compressor unit 30, a compressed air passage 33 which feeds compressed air discharged from the compressor unit 30 to the internal combustion engine 100, an intercooler 108 which cools the compressed air flowing through the compressed air passage 33, and an LPL-EGR passage 8 which recirculates at least a part of the exhaust gas flowing through the exhaust gas passage 6, into the intake air passage 7.

The compressed air passage 33 includes a cyclone-type collecting device 9 upstream of the intercooler 108. The cyclone-type collecting device 9 collects foreign substances contained in the compressed air.

The configuration of the turbocharging system 1 for use with an internal combustion engine according to the present embodiment will now be described in detail.

As illustrated in FIG. 1, in the turbocharging system 1 for use with an internal combustion engine, the exhaust gas feeding passage 5 and the exhaust gas passage 6 are connected to the turbine unit 20. The exhaust gas feeding passage 5 is connected to an exhaust manifold 101 of the internal combustion engine 100 for use in a vehicle or the like. The turbine unit 20 is provided with a wastegate valve 60 which by passes the turbine impeller 2, and an actuator 61 which drives the wastegate valve 60. An exhaust gas three-way catalyst 106 and a DPF 105 are placed at a downstream side of the exhaust gas passage 6. The LPL-EGR passage 8 is connected to the exhaust gas passage 6 downstream of the DPF 105. The LPL-EGR passage 8 is provided with an EGR cooler 53 which cools EGR gas flowing through the LPL-EGR passage 8, and an EGR valve 51 which opens and closes the LPL-EGR passage 8 to regulate the flow of the EGR gas. The EGR valve 51 is connected to a gas flow regulator 52 which controls the opening and closing of the EGR valve 51. The gas flow regulator 52 is connected to an engine control unit (ECU) 97 mounted in the vehicle.

As illustrated in FIG. 1, the turbine impeller 2 is coupled to the compressor impeller 3 through the rotor shaft 4. The rotor shaft 4 is rotatably supported by a bearing housing 43. This configuration allows the compressor impeller 3 to rotate as the turbine impeller 2 is rotated.

As illustrated in FIG. 1, the compressor unit 30 provided with the compressor impeller 3, has a suction port 31 to which the intake air passage 7 is connected. The intake air passage 7 is provided with an air cleaner 107 and is connected to a PCV passage 11 and the LPL-EGR passage 8 downstream of the air cleaner 107. The PCV passage 11 is for blowby gas to flow from inside the crankcase of the internal combustion engine 100. The compressor unit 30 also has an outlet port 32, through which the compressed air is discharged. The outlet port 32 is connected to the compressed air passage 33. The intercooler 108 is placed on the compressed air passage 33. The collecting device 9 is placed on the compressed air passage 33 upstream of the intercooler 108. In the present embodiment, the collecting device 9 is positioned immediately after the outlet port 32 on the compressed air passage 33.

The exhaust gas discharged from the exhaust manifold 101 of the internal combustion engine 100 is fed through the exhaust gas feeding passage 5 to the turbine unit 20 and rotates the turbine impeller 2. The turning force of the turbine impeller 2 rotates the compressor impeller 3 through the rotor shaft 4. The rotation of the compressor impeller 3 generates intake vacuum, which in turn draws the intake air from the intake air passage 7 to the compressor impeller 3. The intake air is drawn into the compressor unit 30 and compressed before it is discharged from the compressor unit 30 through the outlet port 32 into the compressed air passage 33. The compressed air then flows through the collecting device 9, the intercooler 108, and an intake manifold 102 and is fed into the internal combustion engine 100.

Figure 2:
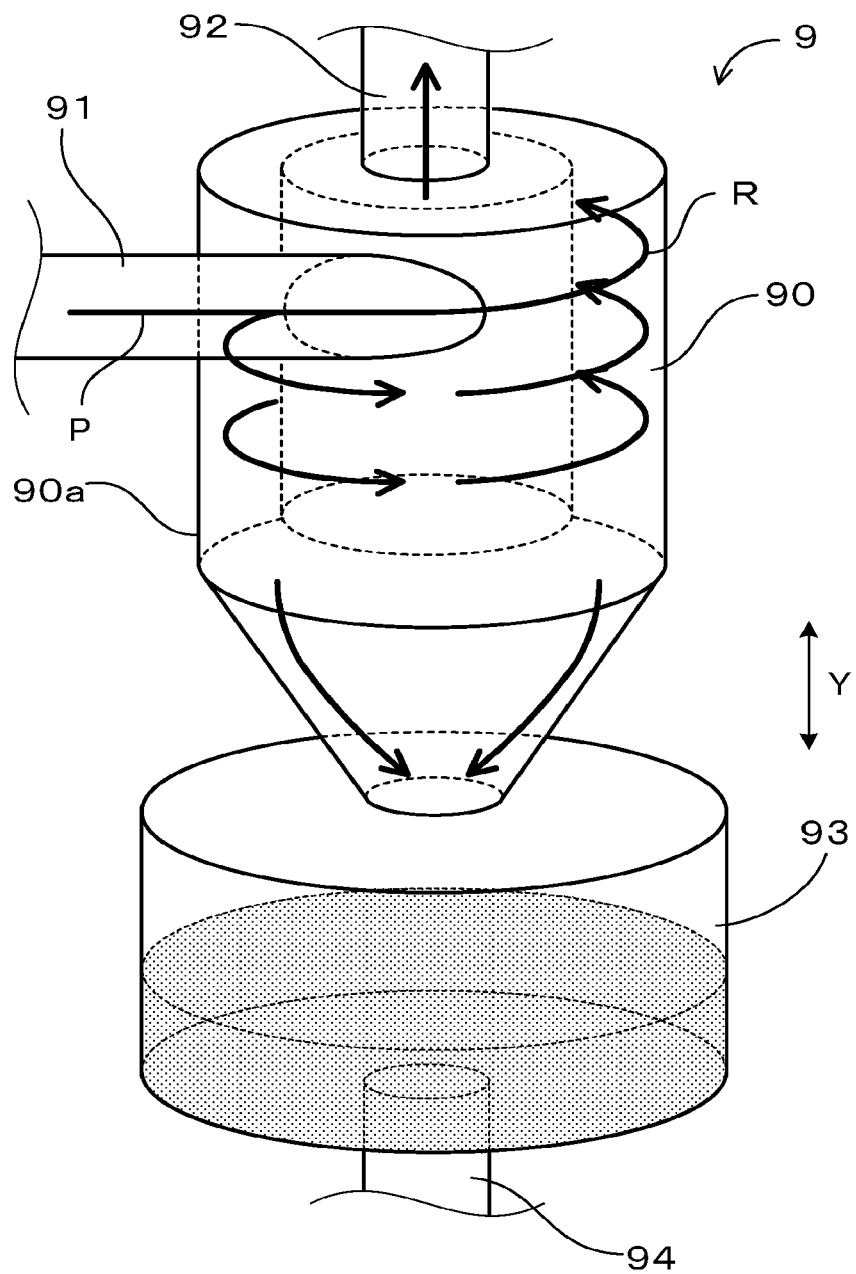
FIG. 2 is a schematic diagram of a cyclone-type collecting device according to the first embodiment.

As illustrated in FIG. 2, the collecting device 9 is a cyclone-type collecting device. The collecting device 9 includes a main body 90, an intake air inlet section 91, an intake air suction section 92, and a reservoir 93. The main body 90 is cylindrical in shape on the upper side in an axial direction (vertical direction) Y and is substantially conical on the lower side in the axial direction Y. The intake air inlet section 91 is connected to the main body 90 on its side wall 90a. The intake air suction section 92 is connected to the main body 90 on its top portion in the axial direction Y. The reservoir 93 is connected to the main body 90 on its bottom portion in the axial direction Y. In the present embodiment, the collecting device 9 is a cyclone-type collecting device, which is of a tangential inlet type in which the intake air inlet section 91 extends in a tangential direction of the main body 90, and of an inversion type in which the reservoir 93 and the intake air suction section 92 are on opposite sides of the main body 90 in the axial direction Y.

As illustrated in FIG. 2, compressed air P discharged from the outlet port 32 (see FIG. 1) flows through the compressed air passage 33 due to its boost pressure and enters the main body 90 through the intake air inlet section 91. On entering the main body 90, the compressed air P flows along the cylindrical inner peripheral surface of the main body 90 to rotate in the main body 90, generating a rotational flow R and thereby producing centrifugal force in the compressed air P. This causes foreign substances originally contained in the EGR gas, such as condensate, in the compressed air P to aggregate on the inner peripheral surface of the main body 90 to be collected. Due to gravity, the collected substances are stored in the reservoir 93 located below the main body 90 in the axial direction Y.

As illustrated in FIG. 1, the reservoir 93 is connected to a collected substance releasing passage 94 which releases the collected substances stored in the reservoir 93, a releasing passage valve 95 which serves as a releasing passage opening/closing section that opens and closes the collected substance releasing passage 94, and an opening/closing controller 96 which controls the open/closed state of the releasing passage valve 95. As the releasing passage valve 95 is opened by the opening/closing controller 96, the collected substances stored in the reservoir 93 are released through the collected substance releasing passage 94 to the outside.

Figure 3:
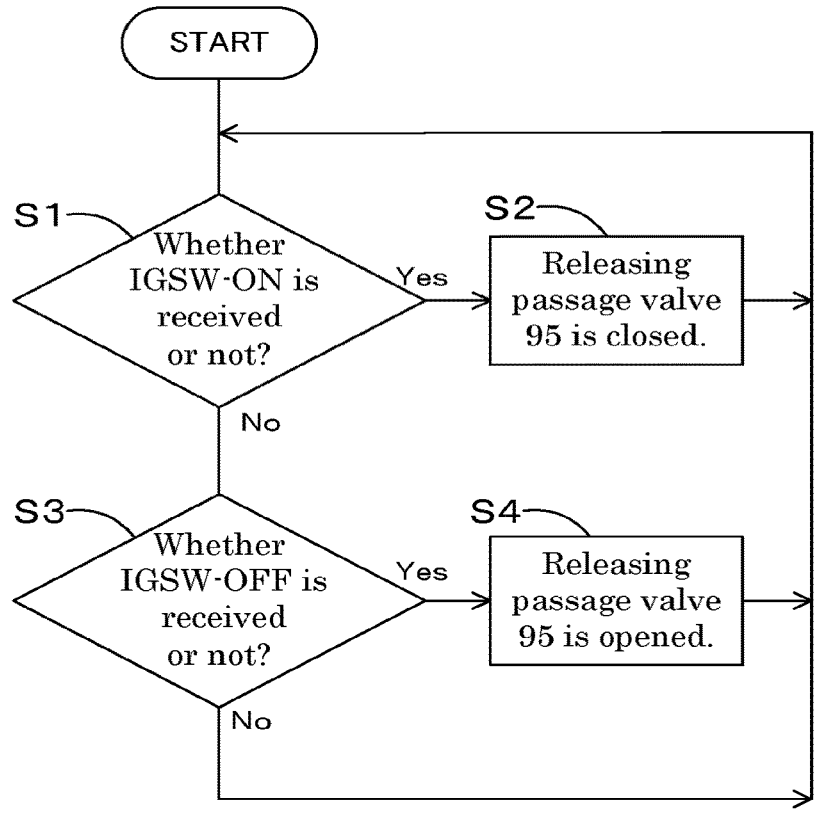
FIG. 3 is a flowchart illustrating the modes of opening/closing control on a releasing passage opening/closing section according to the first embodiment.

In the present embodiment, the opening/closing controller 96 controls the open/closed state of the releasing passage valve 95 on the basis of the on-state and off-state of an ignition switch (not shown) transmitted through the ECU 97. Specifically, as illustrated in FIG. 3, if the opening/closing controller 96 receives a signal IGSW-ON indicative of the on-state of the ignition switch from the ECU 97 (yes in step S1), it closes the releasing passage valve 95 (step S2). This causes collected substances to be stored in the reservoir 93. If the opening/closing controller 96 receives a signal IGSW-OFF indicative of the off-state of the ignition switch from the ECU 97 (no in step S1 and yes in step S3), the opening/closing controller 96 opens the releasing passage valve 95 (step S4). This causes the collected substances in the reservoir 93 to be released through the collected substance releasing passage 94 to the outside.

Accordingly, the collected substances in the reservoir 93 remain stored therein when the internal combustion engine 100 is in operation, for example, when the vehicle is traveling or idling, and the collected substances in the reservoir 93 are released when the internal combustion engine 100 is stopped.

Additionally, the compressed air passage 33 is provided with a bypass passage 80 which bypasses the collecting device 9. The bypass passage 80 is provided with a bypass valve 81, which serves as a bypass passage opening/closing section that opens and closes the bypass passage 80, and a bypass passage opening/closing controller 82, which controls the open/closed state of the bypass valve 81. The bypass passage opening/closing controller 82 is connected to the ECU 97.

The bypass passage opening/closing controller 82 closes the bypass valve 81 when the EGR valve 51, which serves as an LPL-EGR passage opening/closing section, is opened by the gas flow regulator 52, which serves as the LPL-EGR passage opening/closing controller. The bypass passage opening/closing controller 82 opens the bypass valve 81 when the EGR valve 51 is closed by the gas flow regulator 52.

Figure 4:
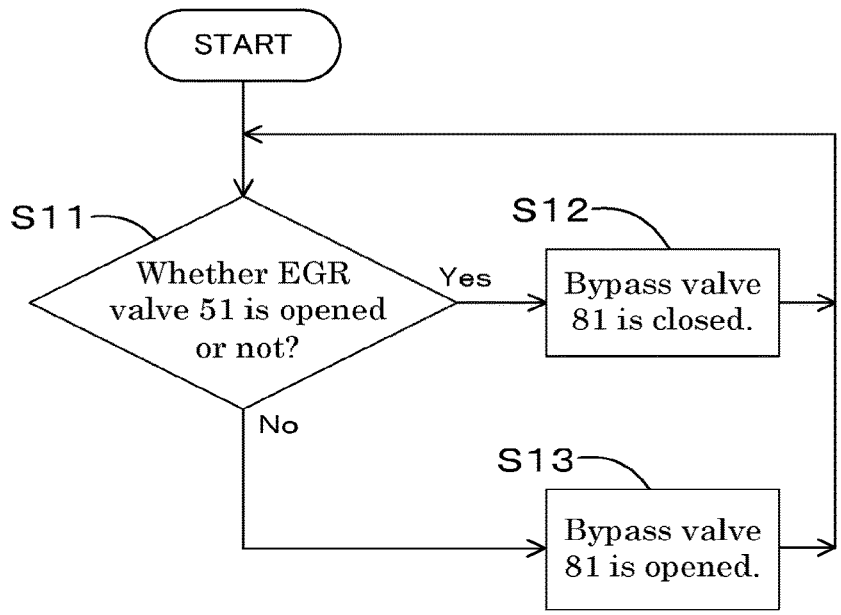
FIG. 4 is a flowchart illustrating the modes of opening/closing control on a bypass passage opening/closing section according to the first embodiment.

Specifically, as illustrated in FIG. 4, the open/closed state of the bypass valve 81 is controlled by the bypass passage opening/closing controller 82 as described below. The ECU 97 determines whether the EGR valve 51 is open (step S11). If the ECU 97 determines that the EGR valve 51 is open (yes in step S11), it allows the bypass passage opening/closing controller 82 to close the bypass valve 81 (step S12). If the ECU 97 determines that the EGR valve 51 is closed (no in step S11), it allows the bypass passage opening/closing controller 82 to open the bypass valve 81 (step S13). This causes the bypass valve 81 to be closed when the EGR valve 51 is open and the bypass valve 81 to be open when the EGR valve 51 is closed; in other words, these valves are controlled in synchronization in such a manner that one is closed when the other is open.

Operational advantages of the turbocharging system 1 for use with an internal combustion engine according to the present embodiment will now be described in detail.

In the turbocharging system 1 for use with an internal combustion engine, the exhaust gas of the internal combustion engine 100 rotates the turbine impeller 2, which rotates the compressor impeller 3 and causes the compressor impeller 3 to compress air fed through the intake air passage 7. The compressed air P flows through the compressed air passage 33, passes through the cyclone-type collecting device 9, and reaches the intercooler 108 before it is fed to the internal combustion engine 100. When the compressed air P is in the cyclone-type collecting device 9, its boost pressure generates the rotational flow R in the collecting device 9. The rotational flow R produces centrifugal force in the compressed air P, causing condensate and other substances contained in the EGR gas to be separated from the compressed air P. In this manner, the present embodiment is capable of inhibiting deposition of condensate on the intercooler 108, which is connected to a position downstream of the collecting device 9, and thereby inhibiting corrosion of the intercooler 108. Placing the collecting device 9 on the compressed air passage 33, through which the compressed air P flows, enables effective use of the boost pressure of the compressed air P as the energy to turn the compressed air P flowing in the collecting device 9 into the rotational flow R. This allows improvement in intake efficiency of the internal combustion engine 100 over a configuration with a filter-type collecting device.

The collecting device 9 according to the present embodiment is positioned immediately after the outlet port 32 on the compressed air passage 33. This enables further effective use of the boost pressure of the compressed air P as the energy to turn the compressed air P into the rotational flow R, in the collecting device 9.

The use of the collecting device 9, which is a cyclone-type collecting device, in the turbocharging system 1 for use with an internal combustion engine enables efficient collection of foreign substances, such as condensate. In this manner, the present embodiment is capable of inhibiting pressure loss and thereby achieving improvement in intake efficiency of the internal combustion engine 100 over a configuration with a filter.

The compressed air passage 33 according to the present embodiment is provided with the bypass passage 80, which bypasses the collecting device 9, the bypass valve 81, which serves as the bypass passage opening/closing section that opens and closes the bypass passage 80, and the bypass passage opening/closing controller 82, which controls the opening and closing of the bypass valve 81. This enables the bypass passage opening/closing controller 82 to open the bypass valve 81 to provide communication through the bypass passage 80 at a desired timing and thereby allow the compressed air P flowing through the compressed air passage 33 to bypass the collecting device 9. As a result, the present embodiment is capable of reducing flow resistance of the compressed air P through the compressed air passage 33 and thereby preventing reduction in intake efficiency of the internal combustion engine 100.

Furthermore, the turbocharging system 1 for use with an internal combustion engine according to the present embodiment includes the EGR valve 51, which serves as the LPL-EGR passage opening/closing section that opens and closes the LPL-EGR passage 8. The bypass passage opening/closing controller 82 is configured to control the bypass valve 81 in such a manner that the bypass valve 81 is closed when the EGR valve 51 is open and the bypass valve 81 is open when the EGR valve 51 is closed. This enables the compressed air P to flow through the collecting device 9 only when the EGR gas is fed to the compressor unit 30 and enables the compressed air P to bypass the collecting device 9 when the EGR gas is not fed to the compressor unit 30.

The present embodiment includes the reservoir 93, which stores substances collected by the collecting device 9, the collected substance releasing passage 94, which releases the collected substances stored in the reservoir 93, the releasing passage opening/closing section (releasing passage valve 95), which opens and closes the collected substance releasing passage 94, and the opening/closing controller 96, which controls the opening and closing of the releasing passage opening/closing section (releasing passage valve 95). This enables the opening/closing controller 96 to release collected substances stored in the reservoir 93 at a desired timing and thereby achieves reduction in effect on the environment.

While the cyclone-type collecting device 9 according to the present embodiment is of the tangential inlet and inversion type, the present invention is not limited thereto. The collecting device 9 may be of any other types as long as it is a cyclone collecting device. Instead of the tangential inlet type used in the present embodiment, an axial-flow type may be employed in which an intake air inlet section 91 is connected to the top of a main body 90 in parallel with the axial direction Y and guide vanes are placed in the main body 90 to turn the compressed air P into a rotational flow. In place of the inversion type used in the present embodiment, a straight flow type may be employed in which a reservoir 93 and an intake air suction section 92 are on the same side of a main body 90.

As described above, the present embodiment provides the turbocharging system 1 for use with an internal combustion engine that is capable of preventing corrosion of the intercooler 108, which is provided to cool compressed air, and of achieving improvement in intake efficiency of the internal combustion engine 100 over a configuration with a filter-type collecting device.

What is claimed is:

1. A turbocharging system for use with an internal combustion engine, the turbocharging system comprising:
    a turbocharger comprising a turbine unit and a compressor unit, the turbine unit comprising a turbine impeller, the compressor unit comprising a compressor impeller connected to the turbine impeller;
    an exhaust gas feeding passage configured to feed exhaust gas of an internal combustion engine to the turbine unit;
    an exhaust gas passage configured to release exhaust gas discharged from the turbine unit outside of the turbocharging system;
    an intake air passage configured to feed intake air into the compressor unit;
    a compressed air passage configured to feed compressed air discharged from the compressor unit to the internal combustion engine;
    an intercooler configured to cool the compressed air flowing through the compressed air passage;
    an LPL-EGR passage configured to recirculate at least a pan of the exhaust gas flowing through the exhaust gas passage, into the intake air passage;
    a cyclone collecting device arranged in the compressed air passage and upstream of the intercooler, the cyclone collecting device configured to collect foreign substances contained in the compressed air; and
    wherein the compressed air passage is provided with a bypass passage configured to bypass the cyclone collecting device, a bypass passage opening/closing section configured to open and close the bypass passage, and a bypass passage opening/closing controller being configured to control open/closed state of the bypass passage opening/closing section.

2. The turbocharging system for use with an internal combustion engine according to claim 1, further comprising an LPL-EGR passage opening/closing section configured to open and close the LPL-EGR passage, wherein the bypass passage opening/closing controller is configured to control the bypass passage opening/closing section in such a manner that the bypass passage opening/closing section is closed when the LPL-EGR passage opening/closing section is open and the bypass passage opening/closing section is open when the LPL-EGR passage opening/closing section is closed.

3. The turbocharging system for use with an internal combustion engine according to claim 1, further comprising:

a reservoir configured to store substances collected by the cyclone collecting device; a collected substance releasing passage configured to release the collected substances stored in the reservoir; a releasing passage opening/closing section configured to open and close the collected substance releasing passage; and an opening/closing controller configured to control open/closed state of the releasing passage opening/closing section.

4. The turbocharging system for use with an internal combustion engine according to claim 3, wherein the reservoir is located below a main body of the cyclone collecting device in an axial direction of the main body.

* * * * *